United States Patent
Hasani et al.

(10) Patent No.: US 10,212,069 B2
(45) Date of Patent: Feb. 19, 2019

(54) FORWARDING OF MULTICAST PACKETS IN A NETWORK

(71) Applicant: Cisco Technology, Inc., San Jose, CA (US)

(72) Inventors: Naader Hasani, San Jose, CA (US); Mohammed Ismael Tatar, Kanata (CA); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/377,871

(22) Filed: Dec. 13, 2016

(65) Prior Publication Data
US 2018/0167311 A1    Jun. 14, 2018

(51) Int. Cl.
*H04L 12/761* (2013.01)
*H04L 12/18* (2006.01)
*H04L 12/741* (2013.01)

(52) U.S. Cl.
CPC .............. *H04L 45/16* (2013.01); *H04L 12/18* (2013.01); *H04L 45/74* (2013.01); *H04L 12/1886* (2013.01)

(58) Field of Classification Search
CPC .......... H04L 45/16; H04L 45/74; H04L 12/18
See application file for complete search history.

(56) References Cited

U.S. PATENT DOCUMENTS

| | | |
|---|---|---|
| 2002/0186154 A1 | 12/2002 | Cheung et al. |
| 2003/0223372 A1 | 12/2003 | Sanchez et al. |
| 2007/0217420 A1 | 9/2007 | Raj et al. |
| 2011/0044171 A1 | 2/2011 | Csaszar et al. |
| 2015/0078378 A1 | 3/2015 | Wijnands et al. |
| 2015/0078379 A1 | 3/2015 | Wijnands et al. |
| 2015/0131658 A1* | 5/2015 | Wijnands ................ H04L 45/16 370/390 |

(Continued)

OTHER PUBLICATIONS

Wijnands et al., "Multicast using Bit Index Explicit Replication," Dec. 4, 2014, draft-wijnands-bier-architecture-02, The Internet Society, Reston, VA (twenty-seven pages).

(Continued)

*Primary Examiner* — Gary Mui
(74) *Attorney, Agent, or Firm* — The Law Office of Kirk D. Williams

(57) ABSTRACT

In one embodiment, multicast packets including, but not limited to, Bit Index Explicit Replication (BIER) multicast packets, are forwarded in a network. An independent lookup operation is performed on each destination node identified in the received packet to determine a nexthop to which to forward a copy of the packet. Typically, some or possibly all of these lookup operations are performed in parallel, in contrast to the sequential lookup and bit masking operations of previous BIER packet forwarding specifications and implementations. In one embodiment, the selection of a nexthop for a destination node is made from a set of two or more nexthop nodes on different Equal-Cost Multi-Paths (ECMPs). In one embodiment, compact data structures are used in determining how to forward the received multicast packet, with these compact data structures providing requisite forwarding information without allocating space to unassigned destination nodes.

21 Claims, 10 Drawing Sheets

(56) References Cited

U.S. PATENT DOCUMENTS

| | | | | |
|---|---|---|---|---|
| 2015/0131660 | A1* | 5/2015 | Shepherd | H04L 45/74 370/390 |
| 2016/0119159 | A1* | 4/2016 | Zhao | H04L 12/1854 370/390 |
| 2016/0127139 | A1* | 5/2016 | Tian | H04L 12/185 370/390 |
| 2016/0127142 | A1 | 5/2016 | Tian et al. | |
| 2016/0134535 | A1 | 5/2016 | Callon | |
| 2016/0301628 | A1* | 10/2016 | Wijnands | H04L 49/201 |
| 2017/0302546 | A1* | 10/2017 | Zheng | H04L 43/0811 |
| 2017/0302566 | A1* | 10/2017 | Zhang | H04L 45/16 |
| 2017/0317841 | A1* | 11/2017 | Xu | H04L 12/185 |

OTHER PUBLICATIONS

Wijnands et al., "Encapsulation for Bit Index Explicit Replication in MPLS Networks," Dec. 4, 2014, draft-wijnands-mpls-bier-encapsulation-02, The Internet Society, Reston, VA (thirteen pages).

Albert Tian, "[Bier] blocked based encoding and list based encoding for BIER," Nov. 6, 2014, Bit Indexed Explicit Replication discussion list, The Internet Society, Reston, VA (fifteen pages).

Greg Shepherd, "Bit Indexed Explicit Replication BIER Stateless Multi-point Replication," May 2015, RIPE 70, Réseaux IP Européens Network Coordination Centre (RIPE NCC), Amsterdam, The Netherlands (thirty-three pages).

Wijnands et al., "Multicast using Bit Index Explicit Replication," Jan. 19, 2016, draft-wijnands-bier-architecture-03, The Internet Society, Reston, VA (thirty-six pages).

Wijnands et al., "Encapsulation for Bit Index Explicit Replication in MPLS Networks," Apr. 18, 2016, draft-wijnands-mpls-bier-encapsulation-04, The Internet Society, Reston, VA (fifteen pages).

Communication of the Extended European Search Report, dated Feb. 21, 2018, EP Application 17183240.5, European Patent Office, Munich, Germany (fifteen pages).

Wijnands et al., "Multicast using Bit Index Explicit Replication," draft-ietf-bier-architecture-05, Oct. 28, 2016, The Internet Society, Reston, VA, USA (thirty-six pages).

Wijnands et al., "Encapsulation for Bit Index Explicit Replication in MPLS Networks," draft-wijnands-mpls-bier-encapsulation-01, Oct. 16, 2014, The Internet Society, Reston, VA, USA (eleven pages).

* cited by examiner

FORWARDING OF MULTICAST PACKETS IN A NETWORK

TECHNICAL FIELD

The present disclosure relates generally to forwarding of multicast packets by packet switching devices in a network, including packet switching devices that forward Bit Index Explicit Replication (BIER) multicast packets in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Bit Index Explicit Replication (BIER) is an architecture for the forwarding of multicast data packets in a network. It provides optimal forwarding of multicast packets through a "multicast domain." However, it does not require any explicit tree-building protocol, nor does it require intermediate nodes to maintain any per-flow state. When a multicast data packet enters the domain, the ingress router determines the set of egress routers to which the packet needs to be sent. The ingress router then encapsulates the packet in a BIER header. The BIER header contains a bit string in which each bit represents exactly one egress router in the domain; to forward the packet to a given set of egress routers, the bits corresponding to those routers are set in the BIER header. Elimination of the per-flow state and the explicit tree-building protocols results in a considerable simplification.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
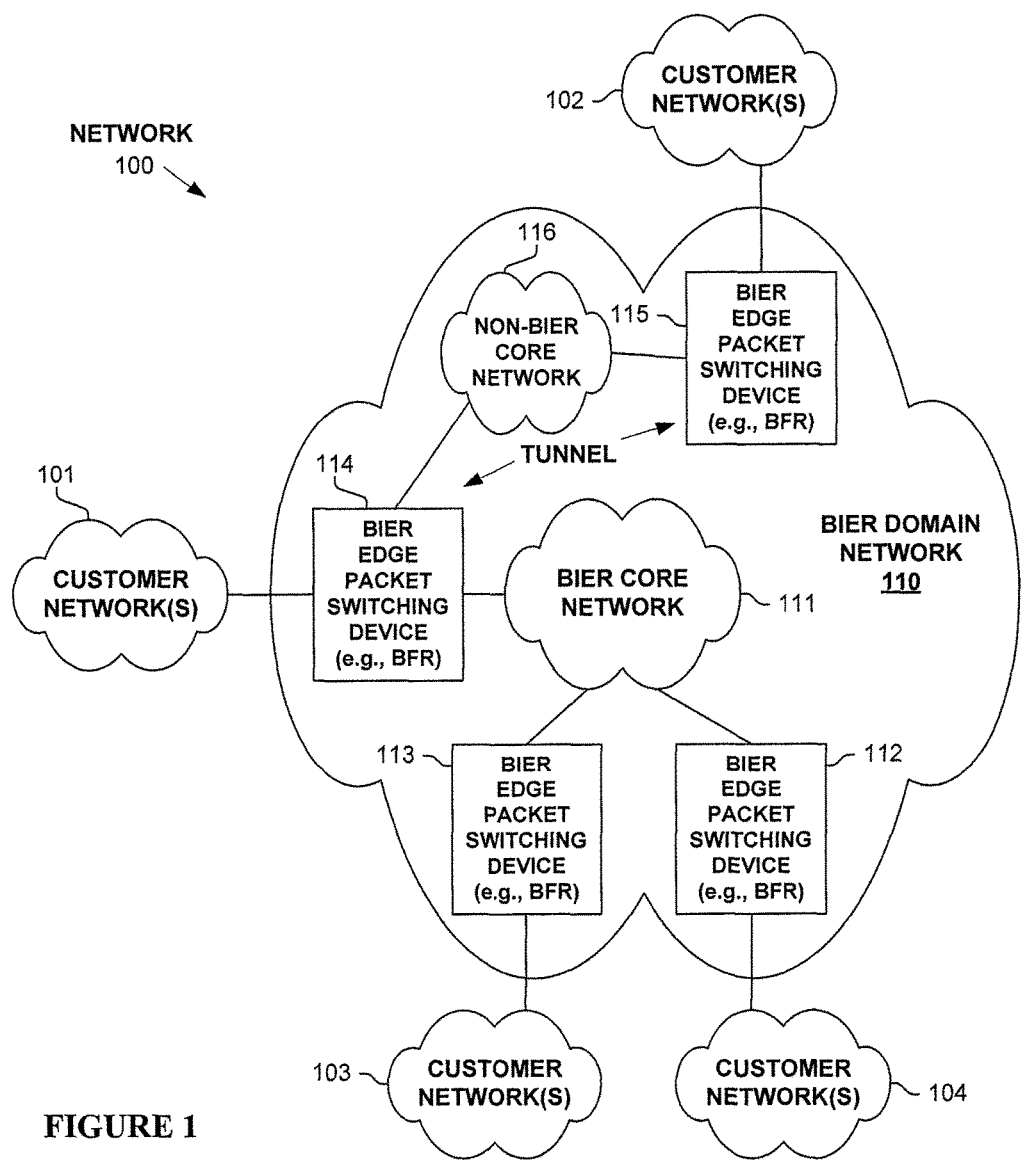
FIG. 1 illustrates a network operating according to one embodiment.

Disclosed are, inter alia, methods, apparatus, computer-storage media, mechanisms, and means associated with forwarding multicast packets in a network, including, but not limited to, Bit Index Explicit Replication (BIER) multicast packets. Embodiments described herein are often described in relation to BIER embodiments as BIER provides an efficient encoding mechanism for a list of nodes to which a multicast packet is to be forwarded. However, other embodiments use one or more different mechanisms for listing nodes to which a multicast packet is to be forwarded.

One embodiment includes a method, comprising: receiving a multicast packet by a packet switching device, with the multicast packet including a list of all nodes to which the multicast packet is to be forwarded, with the list of all nodes consisting of a plurality of nodes; for each particular node of the plurality of nodes, the packet switching device performing a lookup operation in a forwarding data structure to identify a nexthop node to which to send the multicast packet to reach the particular node, with said plurality of lookup operations identifying a plurality of nexthop nodes; and for each particular nexthop node of the plurality of nexthop nodes, the packet switching device sending to said particular nexthop node a single copy of the multicast packet, with the single copy of the multicast packet including a second list of all nodes to which the single copy of the multicast packet is to be forwarded, with the second list of all nodes specifying each of said particular nodes resulting in said identification of the particular nexthop node and not specifying at least one of the plurality of nodes.

One embodiment includes a method, comprising: receiving a multicast packet by a packet switching device, with the multicast packet including a list of all nodes to which the multicast packet is to be forwarded, with the list of all nodes consisting of a plurality of nodes; for each particular node of the plurality of nodes, the packet switching device performing a lookup operation in a forwarding data structure to identify a nexthop node to which to send the multicast packet to reach the particular node, with said plurality of lookup operations identifying a plurality of nexthop nodes, and with at least two of said lookup operations being performed in parallel overlapping at least a portion of time; and for each particular nexthop node of the plurality of nexthop nodes, the packet switching device sending to said particular nexthop node a single copy of the multicast packet, with the single copy of the multicast packet including a second list of all nodes to which the single copy of the multicast packet is to be forwarded, with the second list of all nodes specifying each of said particular nodes resulting in said identification of the particular nexthop node.

In one embodiment, each of the list of all nodes and second list of all nodes is encoded in a Bit Index Explicit Replication (BIER) header including a BIER BitString and included in its respective the multicast packet or the single copy of the multicast packet.

2. Description

Disclosed are, inter alia, methods, apparatus, computer-storage media, mechanisms, and means associated with forwarding multicast packets in a network, including, but not limited to, Bit Index Explicit Replication (BIER) multicast packets. Embodiments described herein include various elements and limitations, with no one element or limitation contemplated as being a critical element or limitation.

Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1 illustrates a network 100 operating according to one embodiment. Multicast packets are forwarded through network 100, possibly using Bit Index Explicit Replication (BIER).

When a multicast data packet enters the BIER multicast domain 110, the ingress edge router determines the set of egress edge routers to which the packet is to be sent. The ingress edge router then encapsulates the packet in a BIER header and sends one or more copies of the packet through the network. Although one embodiment is described in tennis of BIER networks and routers, embodiments are not limited to BIER-based implementations.

As shown in FIG. 1, network 100 includes customer networks 101-104, and BIER domain network 110 including BIER edge Bit-Forwarding Routers (BFRs) 112-115, with a BIER core network 111 (including BFRs) and a non-BIER core network 116 not supporting BIER (e.g., such as in a network in the process of upgrading their routers with BIER capability).

In a previous implementation, the BIER header contains a "BitString" in which each bit represents exactly one egress edge router in the domain. Thus, if there are four thousand routers in the domain, then the BitString is four thousand bits long, and with the set of egress routers to send the packet identified by corresponding bits set in the BIER header.

Sending the full-size BitString in the BIER header is not scalable. Moreover, a small subset of the egress edge routers in a BIER domain may be the recipients of a multicast packet. For example, a multicast packet may only be sent to only three of the four thousand edge BFRs. Thus, only three of the four thousand bits will be set. Also, network administrators may not assign contiguous BIER addresses (e.g., BFR-IDs) so that the bits corresponding to the BFRs are distributed in the BitString.

Figure 2A:
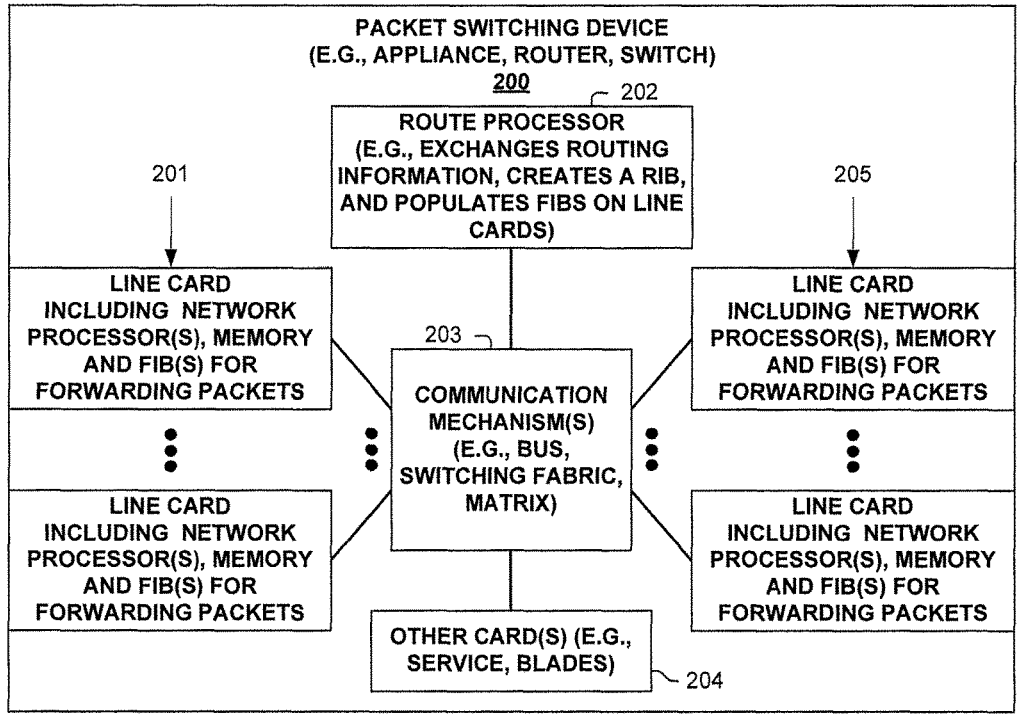
FIG. 2A illustrates a packet switching device according to one embodiment.
Figure 2B:
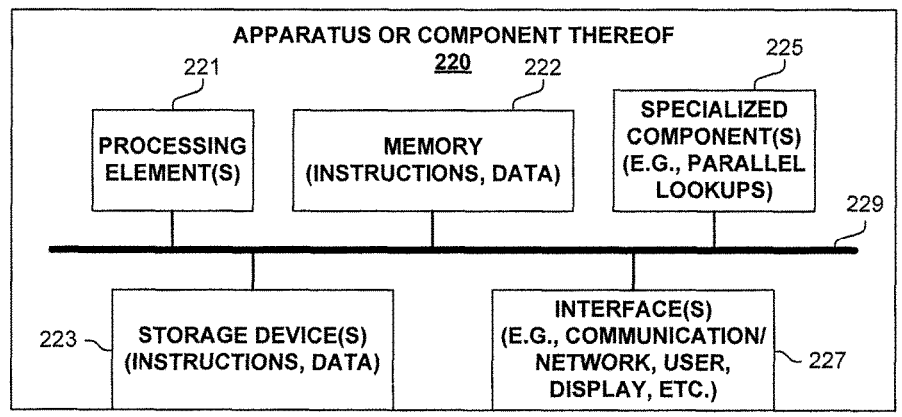
FIG. 2B illustrates an apparatus according to one embodiment.

FIGS. 2A-B and their discussion herein are intended to provide a description of various exemplary packet switching systems used according to one embodiment. One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with forwarding multicast packets in a network, including, but not limited to, Bit Index Explicit Replication (BIER) multicast packets. Packet switching device 200 also has a control plane with one or more processing elements 202 for managing the control plane and/or control plane processing of packets associated with forwarding multicast packets in a network, including, but not limited to, Bit Index Explicit Replication (BIER) multicast packets. Packet switching device 200 also includes other cards 204 (e.g., service cards, blades) which include processing elements that are used in one embodiment to process packets associated with forwarding multicast packets in a network, including, but not limited to, Bit Index Explicit Replication (BIER) multicast packets, and some communication mechanism 203 (e.g., bus, switching fabric, and/or matrix, etc.) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device

200. In one embodiment, line cards 201 and/or 205 use a tie-breaking selection ordering of manipulated ingress point identifiers in determining which packets/cells to send before other packets/cells having a same timestamp.

FIG. 2B is a block diagram of an apparatus 220 used in one embodiment associated with forwarding multicast packets in a network, including, but not limited to, Bit Index Explicit Replication (BIER) multicast packets. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222, storage device(s) 223, specialized component(s) 225 (e.g. optimized hardware such as for performing lookup and/or packet processing operations, performing multiple lookup and/or other operations in parallel, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
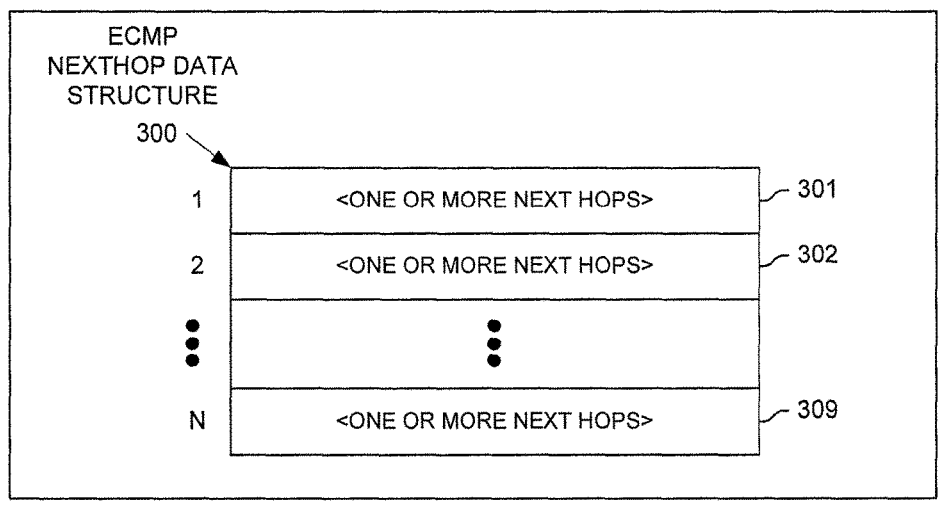
FIG. 3A illustrates a data structure according to one embodiment.

FIG. 3A illustrates an Equal-Cost Multi-Path (ECMP) data structure 300 used in one embodiment to identify a nexthop to which to send a packet based on the result of a lookup operation identifying an entry 301-309. In one embodiment, there are N possible nodes to which to send a multicast packet, with ECMP data structure 300 including an entry 301-309 for each of these N possible nodes. In one embodiment, each of entries 301-309 is populated with the identification of a single nexthop if there is a single best path to reach the corresponding node, or is populated with the identification of two or more nexthops if there are multiple best paths to reach the corresponding node (from which one of these nexthops will be selected). In one embodiment, one or more of entries 301-309 are populated with the identification of a single nexthop or multiple nexthops with or without regard to best paths.

Figure 3B:
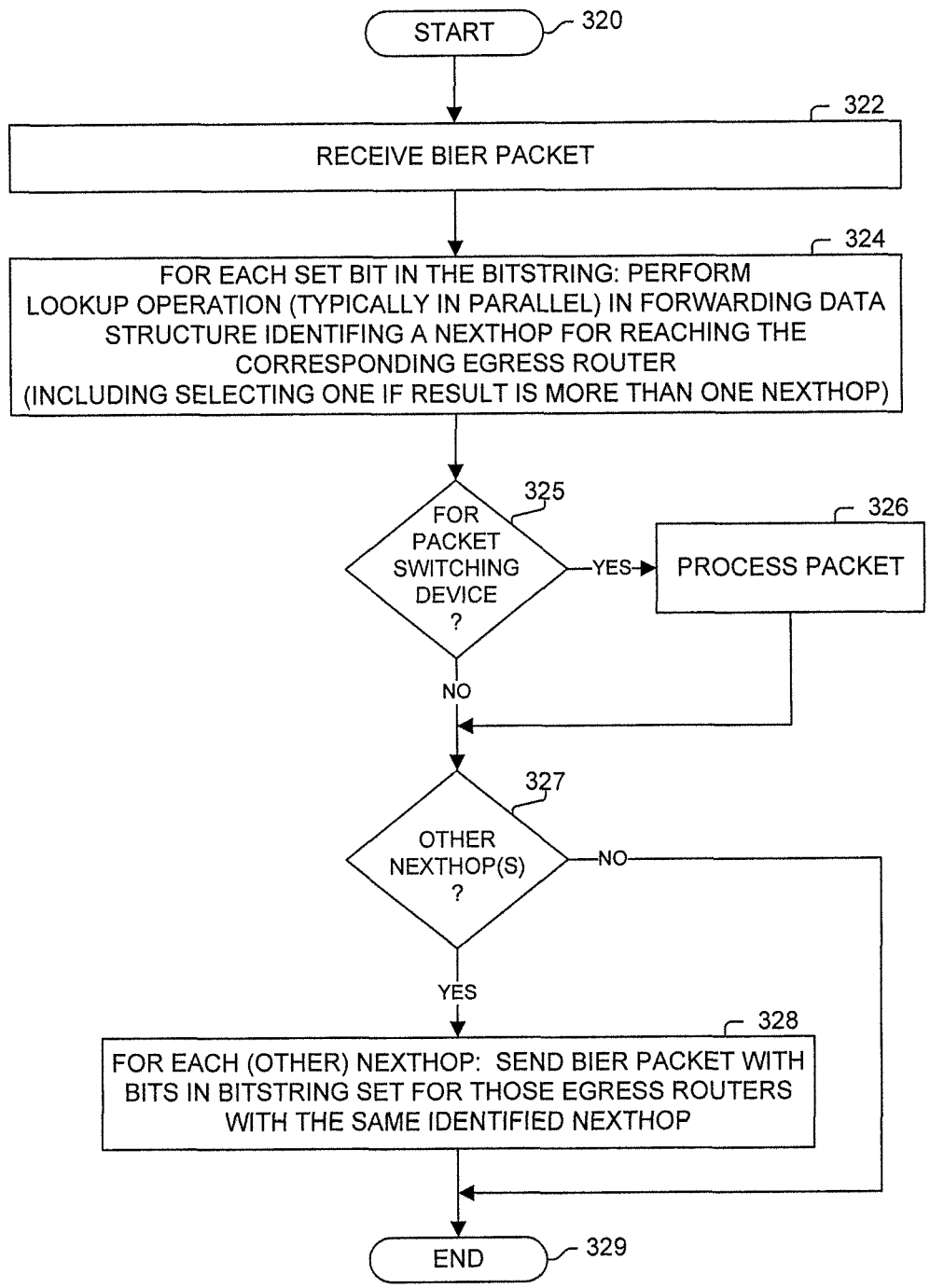
FIG. 3B illustrates a process according to one embodiment.

FIG. 3B illustrates a process according to one embodiment, such as, but not limited to being performed by a packet switching device in a network. Again, embodiments described herein are often described in the context of BIER embodiments as BIER provides an efficient encoding mechanism for a list of nodes to which a multicast packet is to be forwarded. However, other embodiments use one or more different mechanisms for listing nodes to which a multicast packet is to be forwarded with the teaching herein directly applicable.

Processing of the flow diagram of FIG. 3B commences with process block 320. In process block 322, a packet switching device (e.g., router) receives a BIER packet. In process block 324, for each set bit in the BitString, an independent lookup operation is performed in a forwarding data structure identifying a nexthop node to which to forward the packet. In one embodiment, at least two and possibly all of these lookup operations are performed in parallel (i.e., at least partially overlapping in time). In one embodiment, lookup operations are performed in an ECMP data structure (such as, but not limited to, ECMP data structure 300 of FIG. 3A) which may result in multiple nexthops for a given destination node. In such case, one of these multiple nexthops is selected in some manner (e.g., randomly, least used, last used, or via some other selection algorithm). Thus, a lookup operation has been performed with a nexthop identified for each node to which a copy of the received packet is to be forward.

Before processing proceeds to process block 327: as determined in process block 325, if a copy of the packet is to be consumed by the packet switching device, then in process block 326, the received packet is accordingly processed as indicated by process block 326.

Processing proceeds to process block 327, wherein a determination is made whether there are one or more nexthop nodes to which to send a copy of the multicast packet. As so determined, if there are not, then processing of the flow diagram of FIG. 3B is complete; otherwise processing proceeds to process block 328.

In process block 328 a copy of the received multicast packet is forwarded to each of the one or more nexthop nodes identified by the lookup operations in process block 324. One embodiment sends a single copy of the received multicast packet to a particular nexthop node by setting corresponding bits of all destination nodes whose lookup operation resulted in the identification of the particular nexthop in a BitString (and clearing all other bits) included in a particular copy of the received multicast packet sent to the particular nexthop node. In this manner, a single copy of the received multicast packet is sent to each nexthop node identified in a lookup operation (e.g., in process block 324). One embodiment does not perform such consolidation and sends multiple copies of the received multicast packet to a same nexthop node.

As identified by process block 329, processing of the flow diagram of FIG. 3B is complete.

One embodiment includes a packet switching device that has a distributed forwarding architecture, such as, but not limited to one that performs ingress and egress lookup operations and forwarding decisions for each packet. One embodiment reduces (e.g., minimizes) the number of copies of packets sent through a communications mechanism (e.g., switching fabric) of the packet switching device from an ingress line card, port, and/or processing engine to an egress line card, port, and/or processing engine. One embodiment uses this reduction discipline when forwarding multicast packets, which may include, but is not limited to BIER packets (with forwarding decisions based on lookup operations using a compact BIER forwarding data structure such as described herein or another forwarding data structure).

One embodiment includes an ingress forwarding data structure that identifies for each multicast endpoint: one or more egress line cards, ports, and/or processing engines to which an egress forwarding decision is to be performed. In one embodiment, ingress lookup operations on different multicast endpoints may result in multiple copies of a multicast packet to be sent to the same egress line card, port, and/or processing engine. However, one embodiment consolidates the ingress forwarding decisions to send only a single packet (or a reduced number of packets) to an egress line card, port, and/or processing engine.

Figure 3C:
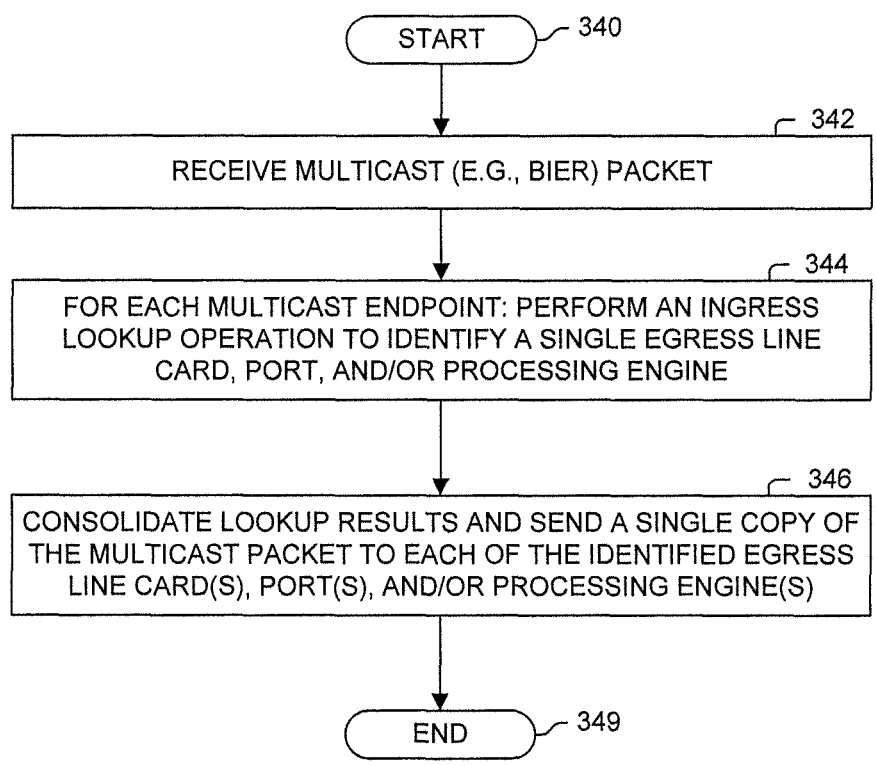
FIG. 3C illustrates a process according to one embodiment.

FIG. 3C illustrates a process performed in one embodiment. Processing begins with process block 340. In process block 342, the multicast (e.g., BIER) packet is received. In process block 344, for each multicast endpoint identified for the multicast packet, an ingress lookup operation is performed to identify a single egress line card, port, and/or processing engine. In process block 346, these ingress lookup results are consolidated such that only a single copy of the multicast packet is sent to each identified egress line card, port, and/or processing engine. Processing of the flow diagram of FIG. 3C is complete as identified by process block 349.

Figure 4A:
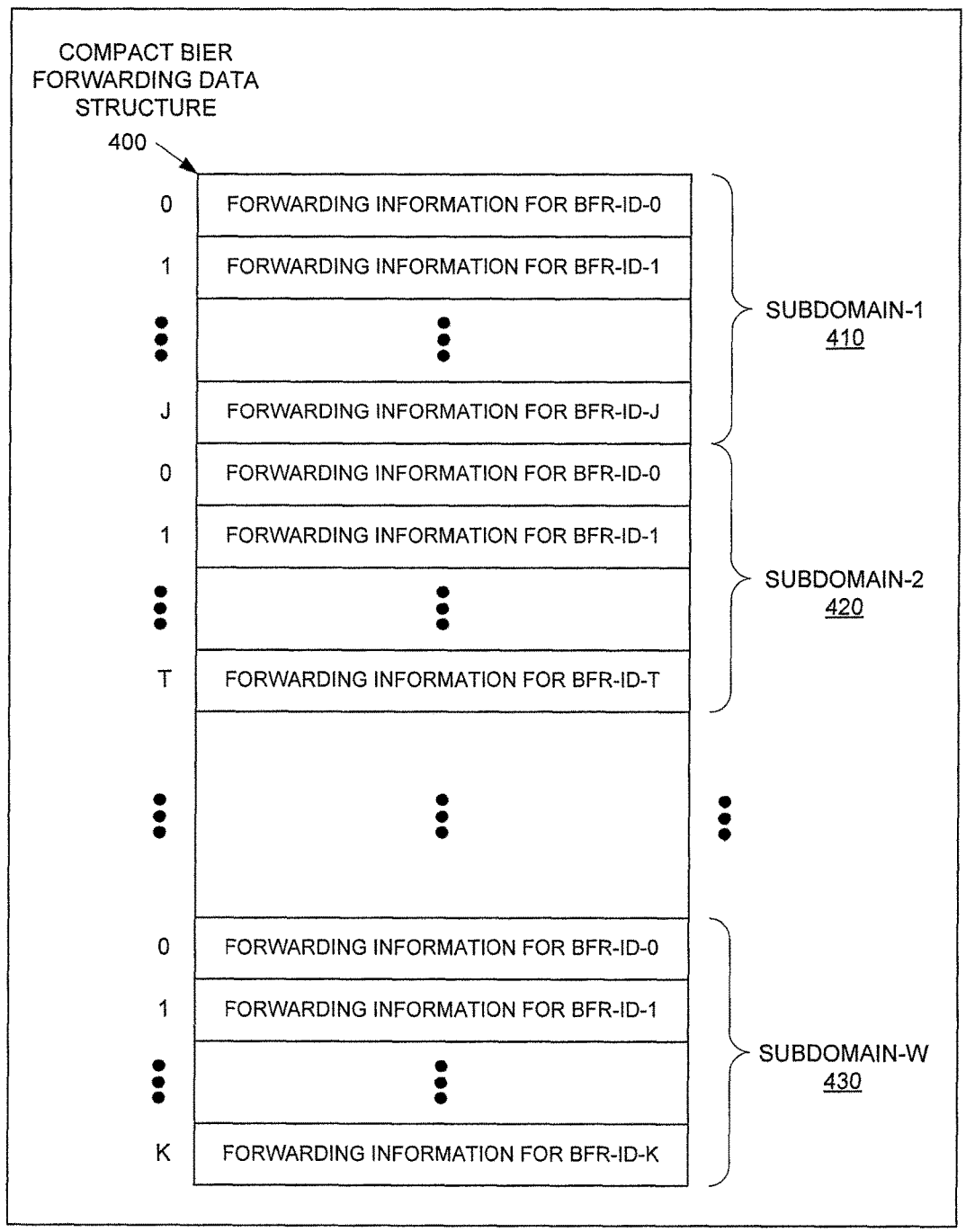
FIG. 4A illustrates a data structure according to one embodiment.

FIG. 4A illustrates a compact BIER forwarding data structure 400 according to one embodiment. One embodiment only allocates space in data structure 400 for assigned BIER Forwarding Router Identifications (BFR-id's), rather than all possible BFR-id's. As shown, compact BIER forwarding data structure 400 includes entries for BFR-id's 0-J in subdomain-1 (410), BFR-id's 0-T in subdomain-2 (420), and BFR-id's 0-K in subdomain-W (430).

Figure 4B:
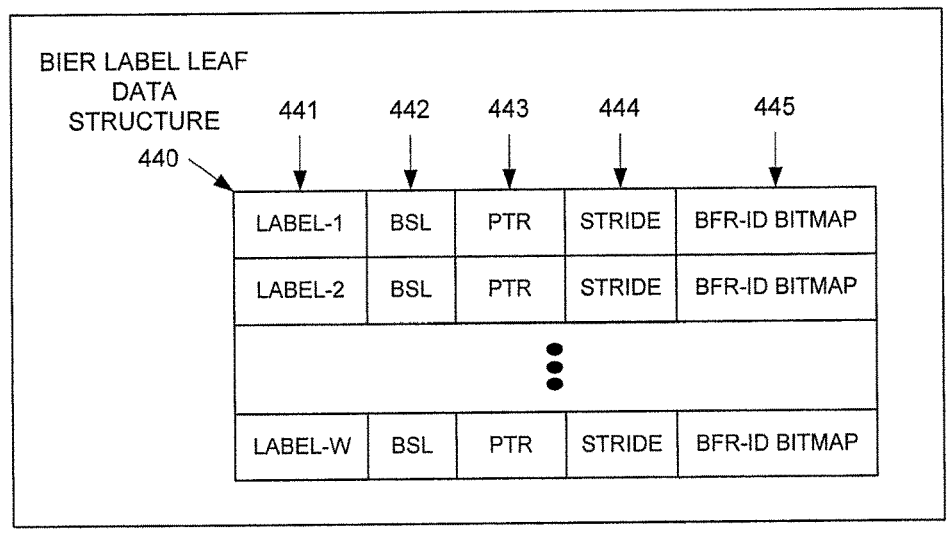
FIG. 4B illustrates a data structure according to one embodiment.

FIG. 4B illustrates a BIER label leaf data structure 440 according to one embodiment. In one embodiment, a BIER multicast packet is received with a label (e.g., BIER-MPLS label) that identifies, inter alia, that it is a BIER packet, and its corresponding sub-domain, Set-Id (SI), and BitStringLength. Based on the BIER-MPLS label (typically at the bottom of the label stack) of a received BIER multicast packet, a lookup operation is performed in BIER label leaf data structure 440 by matching label field 441 therein. From the matching entry, the values of BitStringLength 442, a pointer 443, a stride 444, and a BFR-ID bitmap 445 are retrieved. These values allow the retrieval of corresponding information from compact BIER forwarding data structure 400 of FIG. 4A. Pointer 443 identifies a starting position within BIER forwarding data structure 400, stride 444 identifies how many entries to retrieve, and BFR-ID bitmap 445 identifies which BFR-ID's corresponding to the retrieved entries.

Figure 5A:
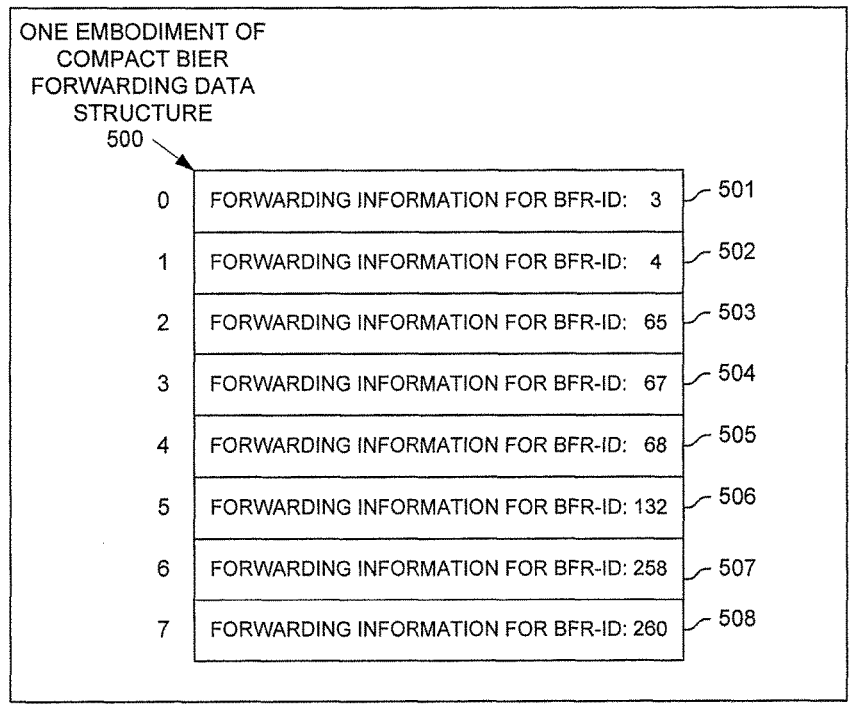
FIG. 5A illustrates a data structure according to one embodiment.
Figure 5B:
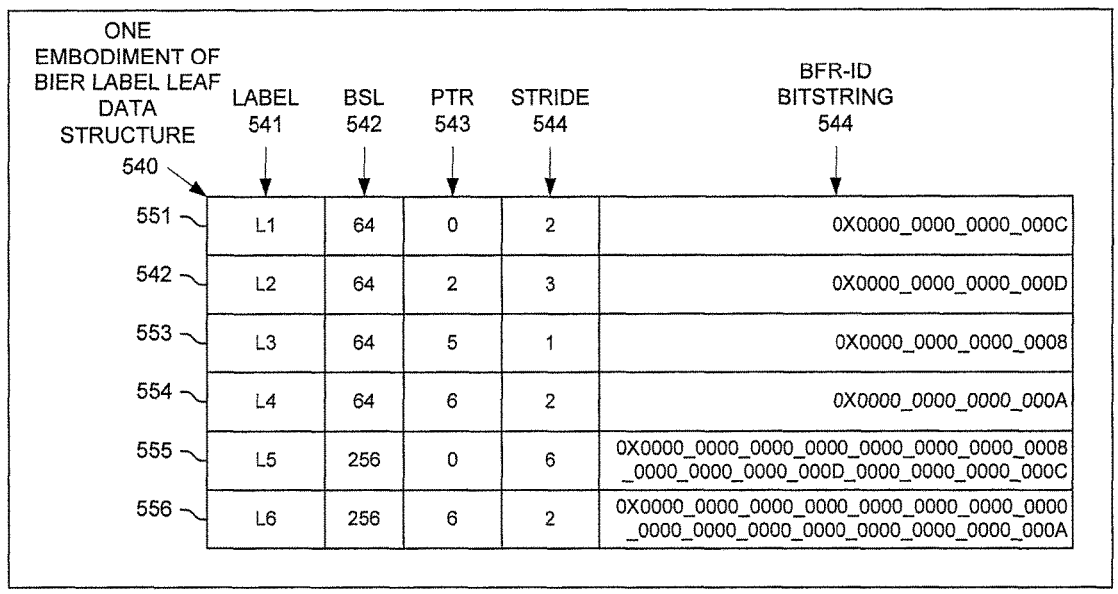
FIG. 5B illustrates a data structure according to one embodiment.

FIGS. 5A-B illustrate the use of a compact BIER forwarding data structure 500 and BIER label leaf data structure 540 for one embodiment of a network.

In one embodiment, compact BIER forwarding data structure 500 includes eight entries for BFR-ID's 3, 4, 65, 67, 68, 132, 258, and 260 (e.g., entries 501-508).

In one embodiment, BIER label leaf data structure 540 includes six entries for labels L1-L6 (e.g., entries 551-556).

For a packet received with a BIER-MPLS label of L1, there are only two corresponding BSR-ID's currently assigned: those being 3 and 4 (e.g., entries 501-502 of compact BIER forwarding data structure 500). In one embodiment, based on label L1, a lookup operation is performed in BIER label leaf data structure 540 identifying entry 551, with a BitStringLength (542) of sixty-four, pointer (543) of zero, stride (544) of two, and BFR-ID bitstring 544 of (0xC) which has two bit positions set identifying BFR-ID's of three and four. Based on these values, stride size of two entries starting a pointer position zero of compact BIER forwarding data structure 500 are retrieved, with the BFR-ID's of three and four of these two entries identified based on BFR-ID bitstring 544 of (0xC).

Similarly, for a packet received with a BIER-MPLS label of L5, there are six corresponding BSR-ID's currently assigned: those being 3, 4, 65, 67, 68, and 132 (e.g., entries 501-506 of compact BIER forwarding data structure 500). In one embodiment, based on label L5, a lookup operation is performed in BIER label leaf data structure 540 identifying entry 555, with a BitStringLength (542) of two hundred fifty-six, pointer (543) of zero, stride (544) of six, and BFR-ID bitstring 544 which has six bit positions set identifying the corresponding six BFR-ID's listed above. Based on these values, stride size of six entries starting a pointer position zero of compact BIER forwarding data structure 500 are retrieved, with the BFR-ID's of these six entries identified based on BFR-ID bitstring 544.

Figure 6:
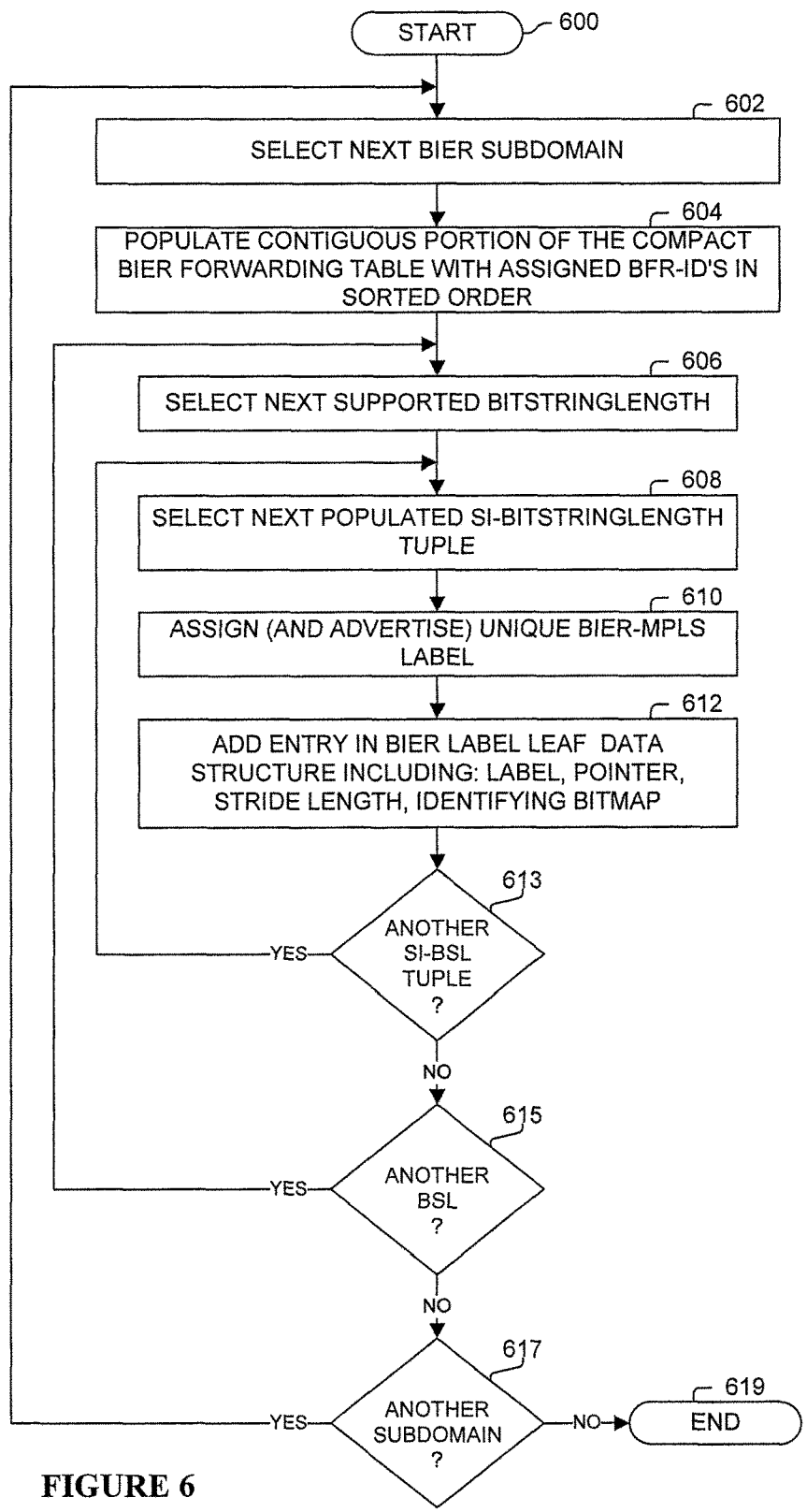
FIG. 6 illustrates a process according to one embodiment.

FIG. 6 illustrates a process according to one embodiment for populating a compact BIER forwarding data structure (e.g., as shown in FIGS. 4A and 5A) and BIER label leaf data structure (e.g., as shown in FIGS. 4B and 5B).

Processing begins with process block 600. In process block 602 a first/next BIER subdomain is selected. In process block 604, a next contiguous portion of the compact BIER forwarding data structure is populated with forwarding information for assigned BFR-ID's in sorted order. In process block 606 a next supported BitStringLength is selected (e.g., in order from smallest to largest). In process block 608 a next populated SI-BitStringLength tuple is selected. In process block 610, a unique BIER-MPLS label is assigned (and advertised to other BIER nodes). In process block 612, a corresponding entry is added to the BIER label leaf data structure, with this entry typically including the assigned BIER-MPLS label, pointer, stride, and BFR-ID identifying bitmap.

As determined in process block 613, if there is another SI-BitStringLength tuple used, then processing returns to process block 608; else processing proceeds to process block 615.

As determined in process block 615, if there is another BitStringLength used, then processing returns to process block 606; else processing proceeds to process block 617.

As determined in process block 617, if there is another subdomain used, then processing returns to process block 602; else processing of the flow diagram of FIG. 6 is complete as indicated by process block 619.

Figure 7:
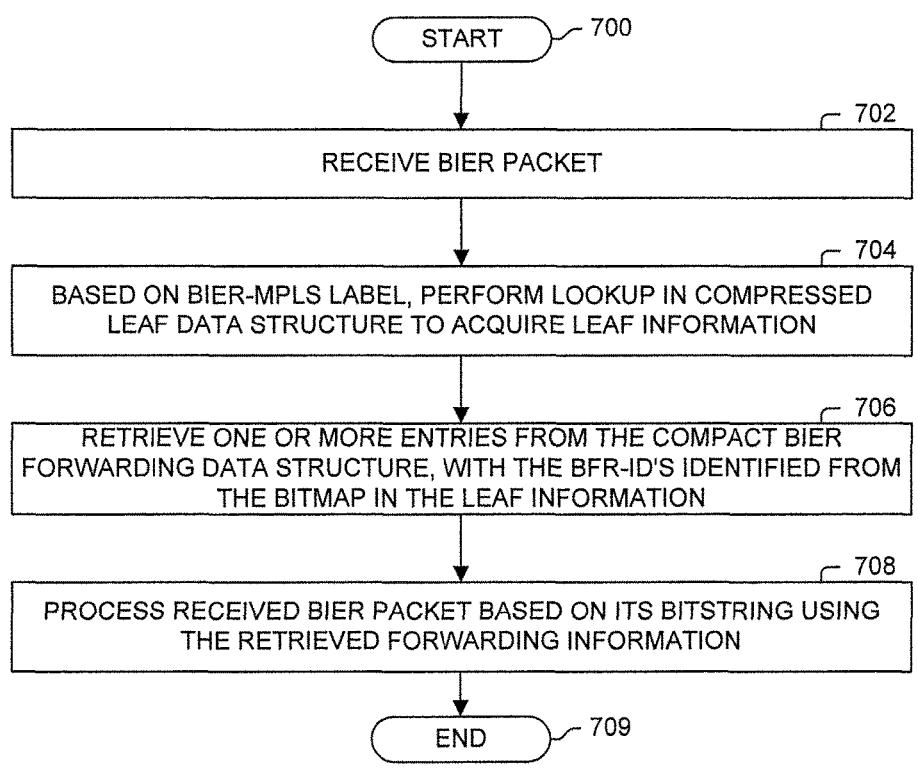
FIG. 7 illustrates a process according to one embodiment.

FIG. 7 illustrates a process according to one embodiment. Processing begins with process block 700. In process block 702, a BIER packet is received. In process block 704, based on the BIER-MPLS label, a lookup operation is performed in a compressed leaf data structure to acquire the leaf information. In process block 706, this leaf information is used to retrieve one or more entries from the compact BIER forwarding data structure, with the bitstring in the leaf information identifying which BFR-ID's the forwarding information corresponds. In process block 708, the received BIER packet is processed based on its BitString using the retrieved forwarding information. In one embodiment, process block 708 includes the processing of process blocks 324-329 of FIG. 3B.

Processing of the flow diagram of FIG. 7 is complete as indicated by process block 709.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   receiving a multicast packet by a packet switching device, with the multicast packet including a list of all nodes to which the multicast packet is to be forwarded, with the list of all nodes consisting of a plurality of nodes;
   for each particular node of the plurality of nodes, the packet switching device performing a lookup operation in a forwarding data structure identifying a nexthop node to which to send the multicast packet to reach the particular node, with said plurality of lookup operations identifying a plurality of nexthop nodes; and
   subsequent to said identifying said nexthop node for each of particular node of the plurality of nodes: for each particular nexthop node of the plurality of nexthop nodes, the packet switching device sending to said particular nexthop node a single copy of the multicast packet, with the single copy of the multicast packet including a second list of all nodes to which the single copy of the multicast packet is to be forwarded, with the second list of all nodes specifying each of said particular nodes resulting in said identification of the particular nexthop node and not specifying at least one of the plurality of nodes.

2. The method of claim 1, wherein each of the list of all nodes and the second list of all nodes is encoded in a Bit Index Explicit Replication (BIER) header including a BIER BitString and included in its respective the multicast packet or the single copy of the multicast packet.

3. The method of claim 2, wherein the forwarding data structure includes:
   a compact BIER forwarding data structure including forwarding information for a plurality of BIER subdomains; and
   a BIER label leaf data structure for identifying forwarding information in the compact BIER forwarding data structure based on BIER-Multiprotocol Label Switching (BIER-MPLS) labels.

4. The method of claim 3, wherein the BIER label leaf data structure includes a plurality of entries, with each of the plurality of entries including a BIER-MPLS label, a pointer into the compact BIER forwarding data structure, a stride length, and a bitmap for identifying BIER Forwarding Router Identification (BFR-id) entries in the compact BIER forwarding data structure.

5. The method of claim 3, wherein the BIER label leaf data structure includes a plurality of entries, with each of the plurality of entries including a BIER-MPLS label, a pointer into the compact BIER forwarding data structure, a stride length, a bitmap for identifying BIER Bit-Forwarding Router Identification (BFR-id) entries in the compact BIER forwarding data structure, and a BitString Length.

6. The method of claim 3, wherein the compact BIER forwarding data structure includes forwarding information for assigned BIER Forwarding Router Identifications (BFR-id's) and non-assigned BFR-id's, wherein said non-assigned BFR-id's includes a plurality of BFR-id's.

7. The method of claim 2, wherein the packet switching device is a Bit Index Explicit Replication (BIER) Bit-Forwarding Router (BFR).

8. The method of claim 1, wherein at least one of said lookup operations in the forwarding data structure identifying the nexthop node includes identifying the nexthop node via a load balancing selection operation among a plurality of nexthop nodes.

9. The method of claim 1, wherein each of a plurality of said lookup operations in the forwarding data structure identifying the nexthop node includes identifying the nexthop node via a load balancing selection operation among a plurality of nexthop nodes, wherein said load balancing selection is done independently for each of the plurality of said lookup operations in the forwarding data structure.

10. The method of claim 1, wherein at least two of said operations of performing the lookup operation are performed in parallel overlapping at least a portion of time.

11. A method, comprising:
    receiving a multicast packet by a packet switching device, with the multicast packet including a list of all nodes to which the multicast packet is to be forwarded, with the list of all nodes consisting of a plurality of nodes, with the plurality of nodes consisting of n nodes, with n being an integer with a value at least two;
    for each particular node of the plurality of nodes, the packet switching device performing a lookup operation in a forwarding data structure identifying a nexthop node to which to send the multicast packet to reach the particular node, with said plurality of lookup operations identifying n node-to-nexthop node pairings that includes a plurality of nexthop nodes that are different; and
    for each particular nexthop node of the plurality of nexthop nodes, the packet switching device sending to said particular nexthop node a single copy of the multicast packet, with the single copy of the multicast packet including a second list of all nodes to which the single copy of the multicast packet is to be forwarded, with the second list of all nodes specifying each of said particular nodes resulting in said identification of the particular nexthop node; wherein the second list includes at least two of the plurality of nodes in at least one of said sent single copy of the multicast packet.

12. The method of claim 11, wherein each of the list of all nodes and second list of all nodes is encoded in a Bit Index Explicit Replication (BIER) header including a BIER BitString and included in its respective the multicast packet or the single copy of the multicast packet.

13. The method of claim 12, wherein the forwarding data structure includes:
    a compact BIER forwarding data structure including forwarding information for a plurality of BIER subdomains; and
    a BIER label leaf data structure for identifying forwarding information in the compact BIER forwarding data structure based on BIER-Multiprotocol Label Switching (BIER-MPLS) labels.

14. The method of claim 13, wherein the compact BIER forwarding data structure includes forwarding information for assigned BIER Forwarding Router Identifications (BFR-id's) and non-assigned BFR-id's, wherein said non-assigned BFR-id's includes a plurality of BFR-id's.

15. The method of claim 12, wherein the packet switching device is a Bit Index Explicit Replication (BIER) Bit-Forwarding Router (BFR).

16. The method of claim 11, wherein at least one of said lookup operations in the forwarding data structure identifying the nexthop node includes identifying the nexthop node via a load balancing selection operation among a plurality of nexthop nodes.

17. The method of claim 11, wherein each of a plurality of said lookup operations in the forwarding data structure identifying the nexthop node includes identifying the nexthop node via a load balancing selection operation among a plurality of nexthop nodes, wherein said load balancing selection is done independently for each of the plurality of said lookup operations in the forwarding data structure.

18. The method of claim 11, wherein all of said operations of performing the lookup operation are performed in parallel overlapping at least a portion of time.

19. The method of claim 11, wherein at least two of said lookup operations are performed in parallel overlapping at least a portion of time.

20. A packet switching device, comprising:
a plurality of interfaces that send and receive packets;
one or more network processors with associated memory; and
one or more packet switching mechanisms that packet switch packets among said interfaces;
wherein the packet switching device performs operations, with said operations including:
receiving a multicast packet by a packet switching device, with the multicast packet including a list of all nodes to which the multicast packet is to be forwarded, with the list of all nodes consisting of a plurality of nodes;
for each particular node of the plurality of nodes, the packet switching device performing a lookup operation in a forwarding data structure identifying a nexthop node to which to send the multicast packet to reach the particular node, with said plurality of lookup operations identifying a plurality of nexthop nodes; and
subsequent to said identifying said nexthop node for each of particular node of the plurality of nodes: for each particular nexthop node of the plurality of nexthop nodes, the packet switching device sending to said particular nexthop node a single copy of the multicast packet, with the single copy of the multicast packet including a second list of all nodes to which the single copy of the multicast packet is to be forwarded, with the second list of all nodes specifying each of said particular nodes resulting in said identification of the particular nexthop node and not specifying at least one of the plurality of nodes.

21. The packet switching device of claim 20, wherein each of the list of all nodes and second list of all nodes is encoded in a Bit Index Explicit Replication (BIER) header including a BIER BitString and included in its respective the multicast packet or the single copy of the multicast packet.

* * * * *